United States Patent [19]

Nakamura et al.

[11] Patent Number: 5,443,782
[45] Date of Patent: Aug. 22, 1995

[54] METHOD OF SHORTENING A RISING TIME OF EACH INJECTION-MOLDING OPERATION IN ASSOCIATION WITH CONTROLLING OF INJECTION-MOLDING SPEED

[75] Inventors: Nobuyuki Nakamura; Toshiyasu Koda; Takayoshi Shioiri, all of Nagano, Japan

[73] Assignee: Nissei Plastic Industrial Co., Ltd., Nagano, Japan

[21] Appl. No.: 302,360

[22] Filed: Sep. 7, 1994

[51] Int. Cl.[6] ............................................. B29C 45/50
[52] U.S. Cl. ................................. 264/328.1; 425/587
[58] Field of Search ............... 264/40.1, 328.1, 328.17, 264/349; 425/145, 582, 583, 587

[56] References Cited

U.S. PATENT DOCUMENTS

| 4,435,142 | 3/1984 | Morita et al. | 425/145 |
| 5,232,714 | 8/1993 | Kohno et al. | 425/145 |

FOREIGN PATENT DOCUMENTS

| 56-133147 | 10/1981 | Japan | 425/587 |
| 6-106587 | 4/1994 | Japan | |

Primary Examiner—Jill L. Heitbrink
Attorney, Agent, or Firm—Weingarten, Schurgin, Gagnebin & Hayes

[57] ABSTRACT

A first direction shifting valve adapted to supply pressurized hydraulic oil to a hydraulic chamber on the rearward displacement side and discharge hydraulic oil from the hydraulic chamber on the rearward displacement side, and moreover, discharge hydraulic oil from a hydraulic chamber on the forward displacement side is disposed in a hydraulic path extending between a hydraulic pump and an injection cylinder. In addition, a second direction shifting valve adapted to supply pressurized hydraulic oil to a chamber on the forward displacement side is disposed in the foregoing hydraulic path. Additionally, a third direction shifting valve is disposed to build a bleeding-off circuit in cooperation with the second direction shifting valve. While a hydraulic path on the rearward displacement side is blocked by the third direction shifting valve, a hydraulic path on the forward displacement side is hydraulically connected to the tank side. When the third direction shifting valve is shifted to the opposite side so that the hydraulic path on the rearward displacement side is hydraulically connected to the tank side and the hydraulic path on the forward displacement side is blocked by the third direction shifting valve, an injection molding operation can be started. With such construction, a rising time of each injection molding operation can be shortened while pressurized hydraulic oil is preliminarily exerted on the hydraulic chamber on the forward displacement side under the bleeding-off condition.

3 Claims, 4 Drawing Sheets

Position where a piston is displaced in the forward direction (mm)

Position where a piston is displaced in the forward direction (mm)

METHOD OF SHORTENING A RISING TIME OF EACH INJECTION-MOLDING OPERATION IN ASSOCIATION WITH CONTROLLING OF INJECTION-MOLDING SPEED

BACKGROUND OF THE INVENTION

1. Field of the Invention

The present invention relates generally to a method of shortening a rising time of each injection-molding operation in association with the controlling an injection-molding speed. More particularly, the present invention relates to a method of the foregoing type which assures that a rising time at the beginning of an injection molding operation to be performed by actuating a piston in an injection cylinder can be shortened, and moreover, an intensity of back pressure can be reduced to a zero level.

2. Background Art

To facilitate understanding of the present invention, typical injection-molding hydraulic circuits each employed for practicing a conventional method of the foregoing type will be described below with reference to FIG. 4 and FIG. 5.

With respect to the injection-molding hydraulic circuit shown in FIG. 4, a direction shifting valve V1 for supplying pressurized hydraulic oil to a hydraulic chamber 3 on the rearward displacement side defined by a piston 2 and discharging it therefrom, and moreover, discharging hydraulic oil from a chamber 4 on the forward displacement side and a direction shifting valve V2 for supplying pressurized hydraulic oil to the chamber 4 and a hydraulic motor M are disposed in a hydraulic circuit for an injection cylinder 1 and a hydraulic pump PV adapted to discharge pressurized hydraulic oil by a variable quantity.

On the other hand, with respect to the injection-molding hydraulic circuit shown in FIG. 5, a hydraulic pump PF adapted to discharge pressurized hydraulic oil by a constant quantity is substituted for the variable quantity type hydraulic pump PV, and a quantity of pressurized hydraulic oil to be discharged from the hydraulic pump PF is properly controlled by a proportional valve V3 disposed at the intermediate position of a hydraulic path extending between the hydraulic pump PF and a direction shifting valve V2 as well as a relief valve V4 disposed between the foregoing hydraulic path and a return circuit extending from a hydraulic motor M.

Irrespective of the structure employed for each of the conventional injection-molding hydraulic circuits shown in FIG. 4 and FIG. 5, when an injection-molding operation is to be started, the direction shifting valve V1 is displaced to the b side from the shown state, and at the same time, the direction shifting valve V2 is displaced to the a side from the shown state, whereby a hydraulic path on the rearward displacement side of the direction shifting valve V1 is hydraulically connected to an oil tank and a hydraulic path on the forward displacement side is held in the blocked state. In addition, a hydraulic path on the pump side of the direction shifting valve V2 and a hydraulic path on the forward displacement side are communicated with each other, whereby pressurized hydraulic oil is exerted on the hydraulic chamber 4 on the forward displacement side, causing the piston 2 to be displaced in the forward direction while discharging hydraulic oil from the hydraulic chamber 3 on the rearward displacement side. Thus, the injection-molding operation can be started.

In the case of the injection-molding hydraulic circuit shown in FIG. 4, a flow rate and a hydraulic pressure of hydraulic oil discharged from the hydraulic pump PV start to simultaneously rise after both the direction shifting valves V1 and V2 each having four ports are shifted to the opposite side, causing the piston 2 to be displaced in the forward direction. However, since the beginning of the forward displacement of the piston 2 is largely affected by the rising state of the hydraulic pump PV, it is practically difficult to quickly displace the piston 2 in the forward direction.

On the other hand, in the case of the injection-molding hydraulic circuit shown in FIG. 5, after the hydraulic pump PF is driven, both the direction shifting valve V1 and V2 are simultaneously actuated together with the proportional valve V3. However, the piston 2 is liable of being displaced in the forward direction with delay not only due to slight delay of the shifting of the proportional valve V3 but also due to the inertia force given by the hydraulic oil present behind the proportional valve V3.

SUMMARY OF THE INVENTION

The present invention has been made in consideration of the aforementioned background.

An object of the present invention is to provide a method of shortening a rising time of each injection-molding operation in association with controlling of an injection-molding speed wherein the method assures that the rising time at the beginning of an injection molding operation can be shortened with the aid of new actuating means merely by slightly changing the structure of a conventional injection-molding hydraulic circuit system, and moreover, an intensity of back pressure can be reduced to a zero level.

The present invention provides a method of shortening a rising time of each injection molding operation in association with the controlling of an injection-molding operation wherein a first direction shifting valve adapted to supply pressurized hydraulic oil delivered from a hydraulic pump to a hydraulic chamber of an injection cylinder on the rearward displacement side and discharge hydraulic oil from the hydraulic chamber on the rearward displacement side, and moreover, discharge hydraulic oil from a hydraulic chamber on the forward displacement side and a second direction shifting valve adapted to supply the pressurized oil to the hydraulic chamber on the forward displacement side are disposed in a hydraulic path extending between the hydraulic pump and the injection cylinder, wherein the method comprises the steps of shifting the first direction shifting valve and the second direction shifting valve so as to allow the pressurized hydraulic oil to be exerted on the hydraulic chamber on the forward displacement side while a hydraulic path on the rearward displacement side is blocked by a third direction shifting valve adapted to build a bleeding-off circuit in cooperation with the second direction shifting valve, causing a hydraulic path on the forward displacement side to be hydraulically connected to the tank side; allowing most of hydraulic oil to bleed off to a tank via the third direction shifting valve; shifting the third direction shifting valve so as to allow the hydraulic path on the rearward displacement side to be hydraulically connected to the tank side; and blocking the hydraulic path on the forward displacement side; whereby the injection molding operation can be started.

The third direction shifting valve is hydraulically connected to the second direction shifting valve via the first direction shifting valve.

It is preferable that a relief valve is disposed at the intermediate position in a hydraulic path extending between the second direction shifting valve and the tank.

With the method of the present invention which is to be practiced by way of the aforementioned steps, when pressurized hydraulic oil is supplied from the hydraulic pump to the hydraulic path on the forward displacement side by shifting the second direction shifting valve in order to start an injection molding operation, a part of the pressurized hydraulic oil is exerted on the hydraulic chamber on the forward displacement side and most of the remaining hydraulic oil bleeds off from the first direction shifting valve to the tank via the third direction shifting valve. At this time, since a flow rate of the hydraulic oil rises to reach a predetermined value, the third direction shifting valve is shifted to the opposite side so as to stop the bleeding-off of hydraulic oil, and moreover, resistance against the flowing of hydraulic oil along the hydraulic path on the rearward displacement side is eliminated. Consequently, the piston can quickly be displaced in the forward direction.

Other objects, features and advantages of the present invention will become apparent from reading of the following description which has been made in conjunction with the accompanying drawings.

DETAILED DESCRIPTION OF THE PREFERRED EMBODIMENTS

The present invention will now be described in detail hereinafter with reference to FIG. 1 to FIG. 3 which illustrate preferred embodiments thereof.

Figure 1:
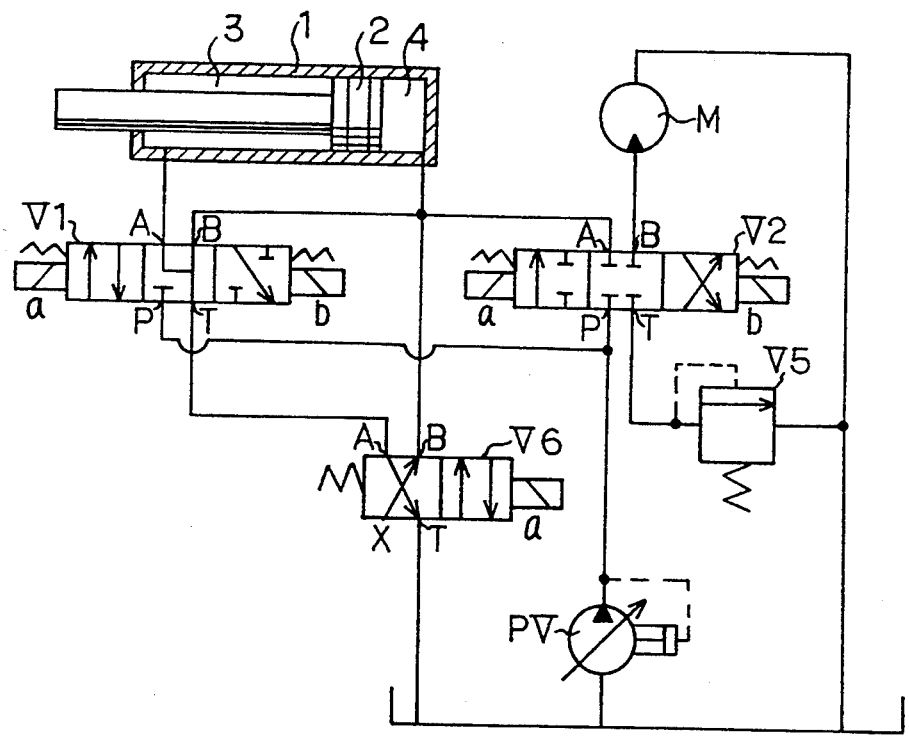
FIG. 1 is a hydraulic circuit diagram which shows the arrangement of hydraulic circuits for performing an injection-molding operation by employing a method of shortening a rising time of each injection-molding operation in association with the controlling of an injection-molding speed in accordance with an embodiment of the present invention.
Figure 2:
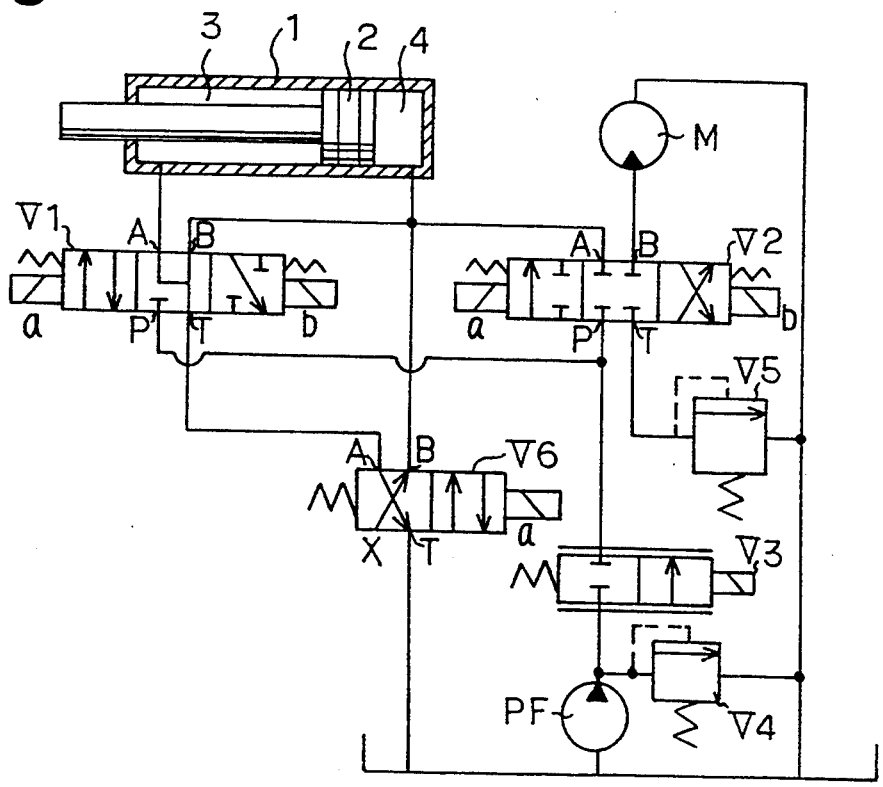
FIG. 2 is a hydraulic circuit diagram which shows the arrangement of hydraulic circuits for performing an injection-molding operation by employing a method of shortening a rising time of each injection molding operation in association with the controlling of an injection-molding speed in accordance with another embodiment of the present invention.
Figure 4:
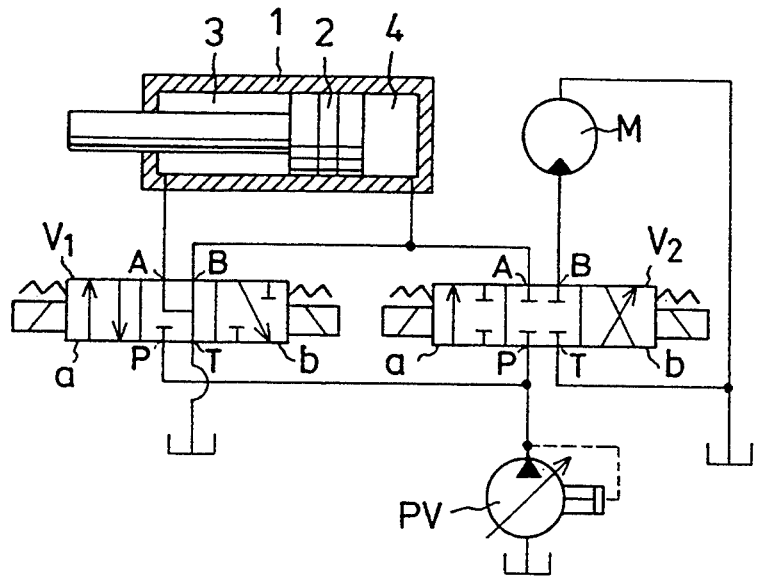
FIG. 4 is a hydraulic circuit diagram which shows the arrangement of hydraulic circuits for performing an injection-molding operation by employing a conventional method of the foregoing type.
Figure 5:
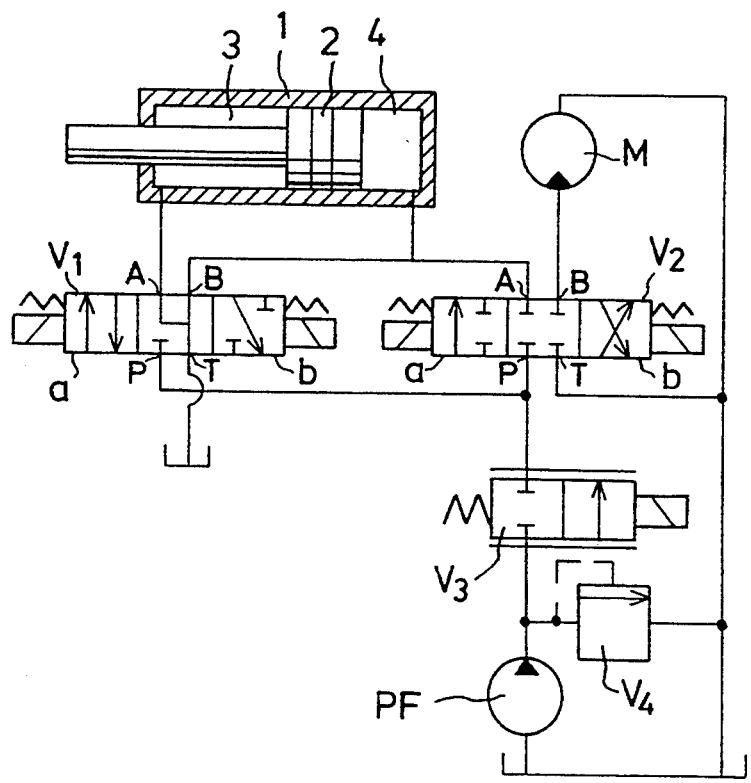
FIG. 5 is a hydraulic circuit diagram which shows the arrangement of hydraulic circuits for performing an injection-molding operation by employing another conventional method of the foregoing type.

FIG. 1 shows by way of circuit diagram a method of shortening a rising time of each injection-molding operation in association with the controlling of an injection-molding speed in accordance with an embodiment of the present invention, and FIG. 2 shows likewise by way of circuit diagram a method of shortening a rising time of each injection-molding operation in association with the controlling of an injection-molding speed in accordance with another embodiment of the present invention. Same components shown in FIG. 1 and FIG. 2 as those shown in FIG. 4 and FIG. 5 are represented by same reference numerals. A substantial difference between each method of the present invention and each conventional method in respect of the structure of an injection-molding hydraulic circuit system consists in that the hydraulic circuit system of the present invention is additionally equipped with a direction shifting valve V6. Other components rather than the direction shifting valve V6 are entirely same as those in each conventional method. For this reason, repeated description on these components is herein eliminated for the purpose of simplification.

In each of the shown embodiments, the direction shifting valve V1 is constructed in the same manner as the direction shifting valve V1 shown in FIG. 4 and FIG. 5 such that a hydraulic path on the rearward displacement side and a hydraulic path on the forward displacement side are hydraulically connected to the tank side. To assure that the hydraulic path on the forward displacement side is hydraulically connected to the tank side while blocking the hydraulic path on the rearward displacement side, the direction shifting valve V6 is disposed between the hydraulic path on the forward displacement side and the hydraulic path hydraulically connected to a port T of the direction shifting valve V1. With this construction, even though pressurized hydraulic oil is exerted on a hydraulic chamber 4 on the forward displacement side before an injection-molding operation is started, a piston 2 can not be displaced in the forward direction but it is held in the immovable state.

In the embodiment shown in FIG. 1, when a direction shifting valve V2 is shifted to the a side from the shown state having the piston 2 displaced in the rearward direction and then held in the immovable state while connecting ports P and A to each other, causing the pressurized hydraulic oil delivered from a hydraulic pump PV to be supplied to the hydraulic path on the forward displacement side, a part of the pressurized hydraulic oil is introduced into the hydraulic chamber 4 on the forward displacement side but most of the remaining hydraulic oil bleeds off to the tank side via ports B and T of the direction shifting valve V6 hydraulically connected to each other.

Since the hydraulic pump PV is constructed in the swash plate type so as to allow pressurized hydraulic oil to be discharged therefrom at a variable flow rate due to the function of a swash plate, it has a certain operational loss time associated with the actuation of the swash plate. However, in view of the fact that a quantity of pressurized hydraulic oil discharged from the hydraulic pump PV rises to reach a preset value while most of the hydraulic oil bleeds off to the tank side, the direction shifting valve V6 is shifted to the left-hand side as seen in the drawing at a good time so that a port A is communicated with the tank side and a port B is held in the blocked state, causing the bleeding-off of the hydraulic oil to be interrupted. This leads to the result that all the hydraulic oil in the hydraulic path on the forward displacement side is immediately introduced into the hydraulic chamber 4 on the forward displacement side, causing the piston 2 to be quickly displaced in the forward direction.

At the time of a metering operation, both the direction shifting valves V1 and V2 are shifted to the b side and a hydraulic motor M is then rotationally driven, whereby the hydraulic oil in the hydraulic chamber 4 on the forward displacement side is caused to pass past a relief valve V5. This makes it possible to properly control back pressure. After completion of the metering operation, the direction shifting valve V1 is shifted to the a side so that ports A and P are communicated with each other, causing pressurized hydraulic oil to be supplied to the hydraulic path on the rearward displacement side. Subsequently, when ports B and T are communicated with each other, the piston 2 is displaced in the rearward direction by the hydraulic force of the pressurized hydraulic oil introduced into a hydraulic chamber 3 on the rearward displacement side to reach a predetermined position while discharging hydraulic oil from the hydraulic chamber 4 on the forward displacement side. Once the foregoing predetermined position is reached, the rearward displacement of the piston 2 is interrupted, resulting in the piston 2 being held in the standby state at the predetermined position.

In the embodiment shown in FIG. 2, after hydraulic oil bleeds off via a relief valve V4, a proportional valve 3 and direction shifting valves V1 and V2 are not simultaneously shifted but only the direction shifting valves V1 and V2 are precedently shifted, and moreover, the hydraulic oil is caused to bleed off via the direction shifting valve V6. As a result, since the hydraulic oil discharged from a hydraulic pump PF flows against the inertia force given by the hydraulic oil present between the proportional valve 3 and the injection cylinder 1, there does not arise a malfunction that the rising of an injection-molding operation is delayed.

Figure 3:
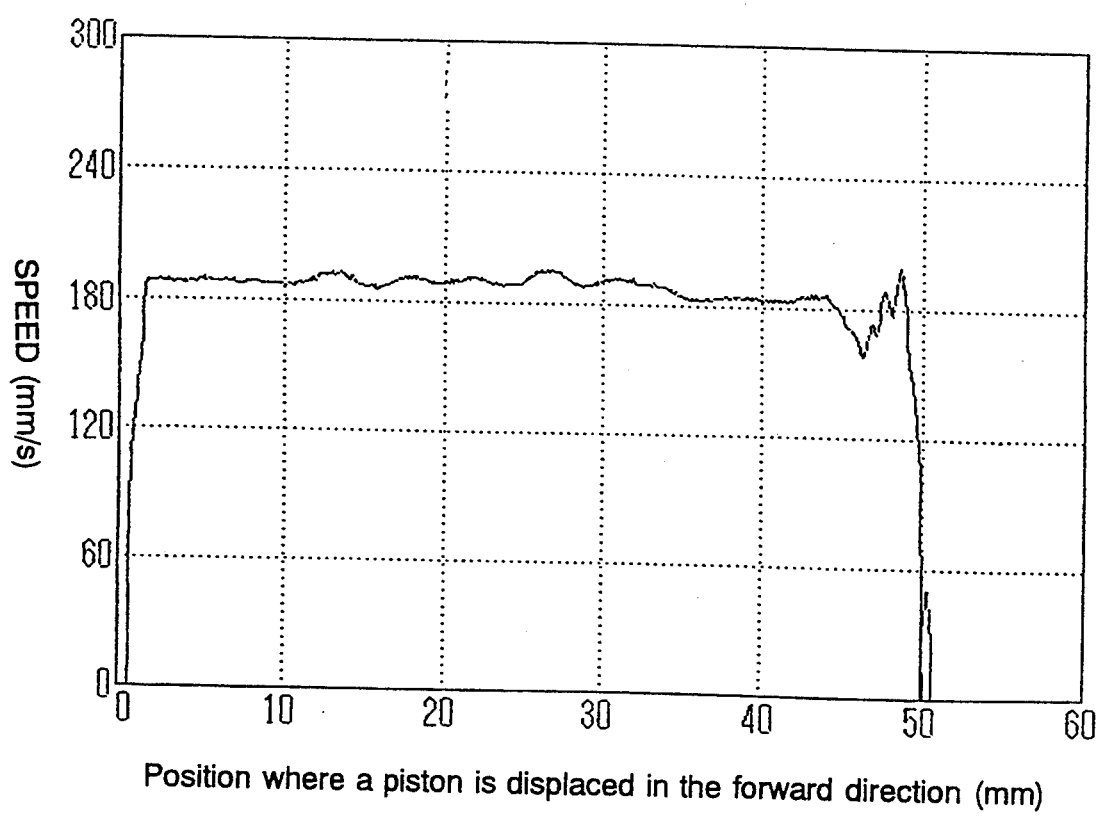
FIG. 3 is a graph which shows the rising state of an injection molding-operation to be performed by an injection molding machine to which the present invention is applied.
Figure 6:
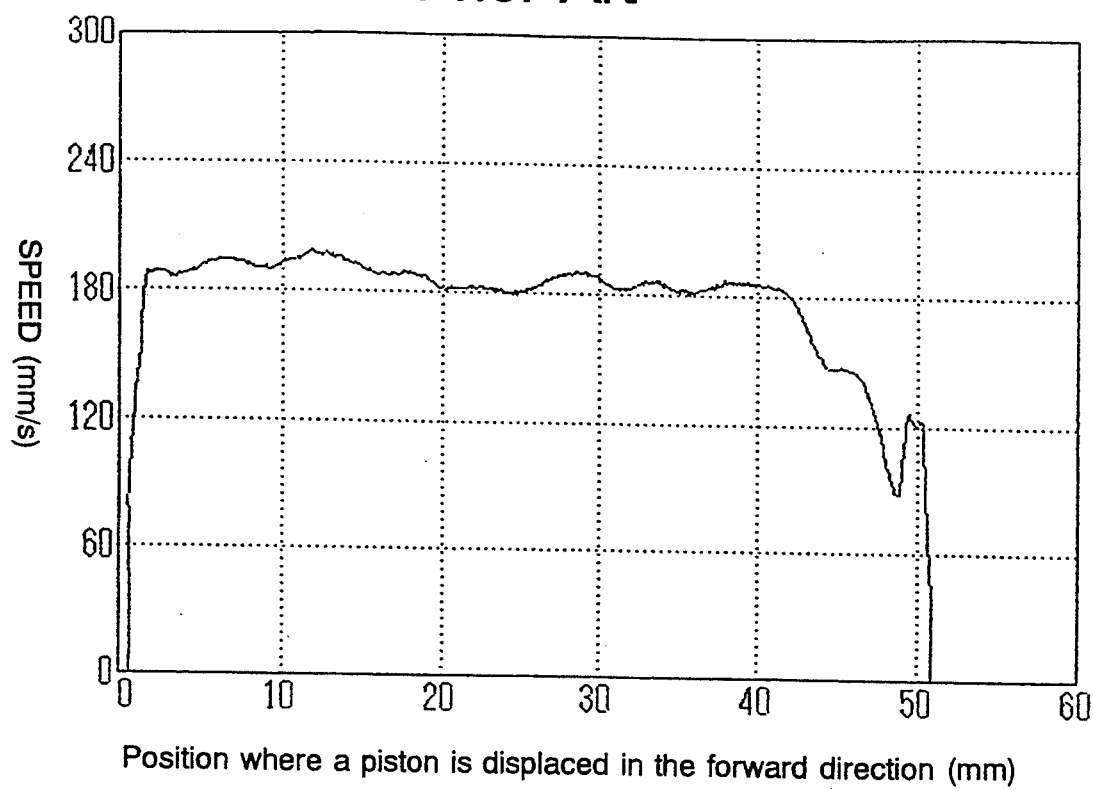
FIG. 6 is a graph which shows the rising state of an injection-molding operation to be performed by employing the conventional method.

FIG. 3 shows by way of graph the rising state of an injection molding operation in the case that the method of the present invention is practiced in accordance with each of the aforementioned embodiments, and FIG. 6 shows likewise by way of graph the rising state of an injection operation in the case that the conventional method is practiced in the aforementioned manner. As is apparent from comparison between both the drawings, the rising state of an injection-molding operation practiced by employing the method of the present invention (as viewed on the right-hand side of FIG. 3) can remarkably be recognized compared with that of the conventional method.

As described above, according to the present invention, when an injection-molding operation is to be performed, hydraulic oil delivered from the hydraulic pump is supplied to the hydraulic path on the forward displacement side so as to allow it to be exerted on the hydraulic chamber on the forward displacement side, subsequently, it bleeds off to the tank side, and thereafter, the hydraulic path on the rearward displacement side is communicated with the tank side by shifting the direction shifting valves in the above-described manner, whereby each injection-molding operation can be started while the hydraulic path on the forward displacement side is held in the blocked state. Consequently, the following advantageous effects can be obtained with the method of the present invention.

Since the pressurized hydraulic oil is exerted on the hydraulic chamber of the injection cylinder on the forward displacement side while most of the hydraulic oil bleeds off to the tank side, irrespective of some operational loss time arising with the swash plate of the discharged oil quantity variable type hydraulic pump, an injection speed of the piston can rise to reach a preset level within a period of time shorter than that of the conventional method by shifting the direction shifting valves in the above-described manner.

In the case that each injection-molding operation is performed with a short injection stroke, the injection stroke is liable of being terminated depending on the responsiveness to the rising state of the swash plate before the piston assumes a preset speed. According to the present invention, however, since the preset speed rises for a short period of time, acceptable molded products can be obtained even though each injection molding is achieved with a small quantity of molten synthetic resin.

Also in the case that the hydraulic pump includes a proportional valve, the injection speed can rise for a short period of time not only regardless of the responsiveness to the shifting of the proportional valve but also without any influence derived from the inertia force given by the hydraulic oil present between the proportional valve and the injection cylinder.

The responsiveness to variation of a flow rate due to the inertia of hydraulic oil and the viscosity of the same in each hydraulic path is improved by allowing most of the hydraulic oil to bleed off to the tank side, and moreover, a magnitude of resistance against flowing of the hydraulic oil is reduced. Thus, it is assured from these viewpoints that the rising time of each injection-molding operation can be shortened.

Since bleeding-off of the hydraulic oil to the tank side can be attained by actuating the direction shifting valve V6, each metering operation can be achieved without any necessity for a certain magnitude of back pressure. Thus, also in the case that each metering operation is performed with a nozzle disengaged from an injection-molding die, e.g., when metering/purging is repeated at the time of rising of each injection-molding operation or when a metering operation is performed during a first injection-molding operation, there does not arise a malfunction that molten resin flows outside of the nozzle due to the presence of a certain magnitude of back pressure.

While the present invention has been described above with respect to two preferred embodiments thereof, it should of course be understood that the present invention should not be limited only to these embodiments but various change or modification may be made without any departure from the scope of the present invention as defined by the appended claims.

What is claimed is:

1. A method of shortening a rising time of each injection-molding operation in association with the controlling of an injection-molding speed wherein a first direction shifting valve adapted to supply pressurized hydraulic oil delivered from a hydraulic pump to a hydraulic chamber of an injection cylinder on the rearward displacement side and discharge hydraulic oil from said hydraulic chamber on the rearward displacement side, and moreover, discharge hydraulic oil from a hydraulic chamber on the forward displacement side and a second direction shifting valve adapted to supply said pressurized hydraulic oil to said hydraulic chamber on the forward displacement side are disposed in a hydraulic path extending between said hydraulic pump and said injection cylinder, comprising the steps of;

shifting said first direction shifting valve and said second direction shifting valve so as to allow said pressurized hydraulic oil to be exerted on said hydraulic chamber on the forward displacement side while a hydraulic path on the rearward displacement side is blocked by a third direction shifting valve adapted to build a bleeding-off circuit in cooperation with said second direction shifting valve, causing a hydraulic path on the forward displacement side to be hydraulically connected to the tank side, allowing most of hydraulic oil to bleed off to a tank via said third direction shifting valve, shifting said third direction shifting valve so as to allow said hydraulic path on the rearward displacement side to be hydraulically connected to the tank side, and blocking said hydraulic path on the forward displacement side, whereby said injection molding operation can be started.

2. The method as claimed in claim 1, wherein said third direction shifting valve is hydraulically connected to said second direction shifting valve via said first direction shifting valve.

3. The method as claimed in claim 1, wherein a relief valve is disposed at the intermediate position in a hydraulic path extending between said second direction shifting valve and said tank.

* * * * *